United States Patent [19]
Mukai et al.

[11] Patent Number: 6,015,023
[45] Date of Patent: Jan. 18, 2000

[54] ELECTRIC POWER STEERING APPARATUS

[75] Inventors: Yoshinobu Mukai; Yoshiki Noro, both of Wako, Japan

[73] Assignee: Honda Giken Kogyo Kabushiki Kaisha, Tokyo, Japan

[21] Appl. No.: 09/074,832

[22] Filed: May 8, 1998

[30] Foreign Application Priority Data

Jun. 26, 1997 [JP] Japan ..................................... 9-170531

[51] Int. Cl.$^7$ ...................................................... B62D 5/04
[52] U.S. Cl. ............................................. 180/446; 701/42
[58] Field of Search .................................... 180/443, 444, 180/445, 446; 701/41, 42

[56] References Cited

U.S. PATENT DOCUMENTS 4,702,335 10/1987 Cage et al. ............................... 180/423
4,954,957 9/1990 Kawagoe et al. ......................... 701/48

FOREIGN PATENT DOCUMENTS 59-100059 6/1984 Japan.

*Primary Examiner*—Kevin Hurley
*Attorney, Agent, or Firm*—Merchant & Gould P.C.

[57] ABSTRACT

An electric power steering apparatus includes a control unit for controlling a steering assist from an electric motor in accordance with steering torque detected by a torque detector. The control unit includes a plurality of assist mode generators to which are allocated different characteristics of target current to provide different steering characteristics, and any one of the assist mode generators can be switchably selected depending on a predetermined condition. All of the assist mode generators are set in such a manner that the respective allocated characteristics of target current become substantially uniform in a high-velocity driving condition. Thus, the steering characteristics are kept constant even when an assist mode change is effected during high-velocity running of the automotive vehicle, so that it is possible to effectively avoid a decline in the driver's steering feeling and adverse effects on the behavior of the automotive vehicle that would be caused by the assist mode change during the high-velocity running.

2 Claims, 6 Drawing Sheets

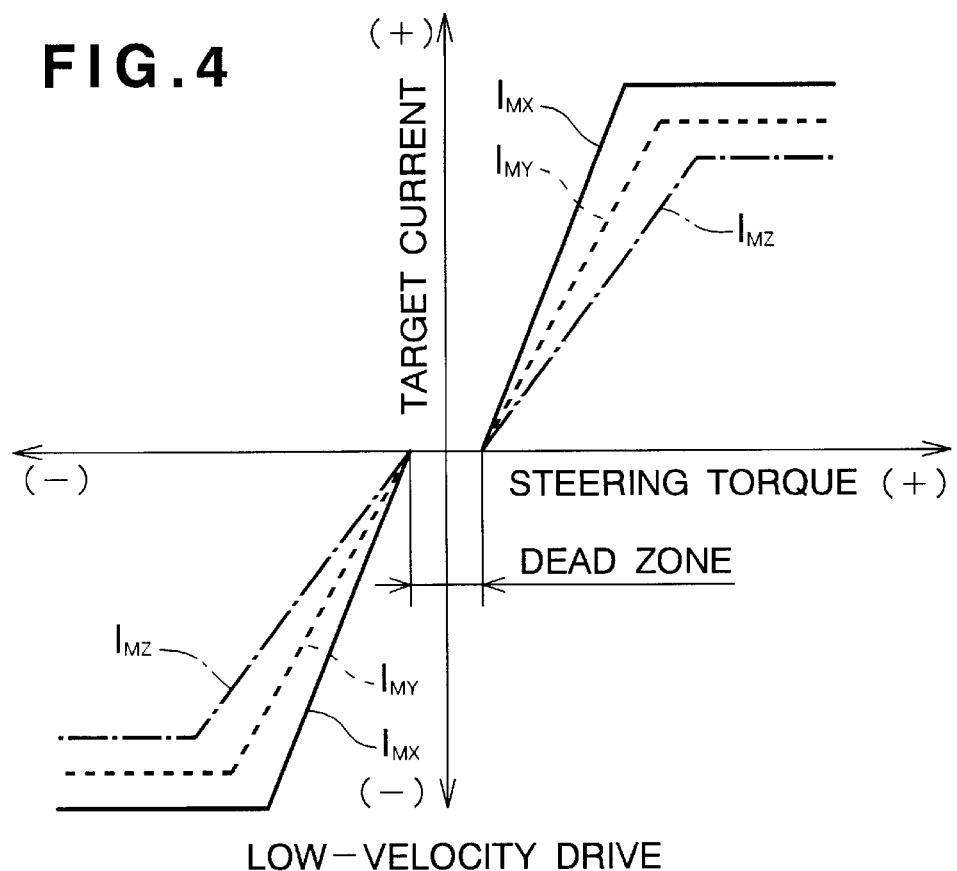
FIG. 4 LOW-VELOCITY DRIVE
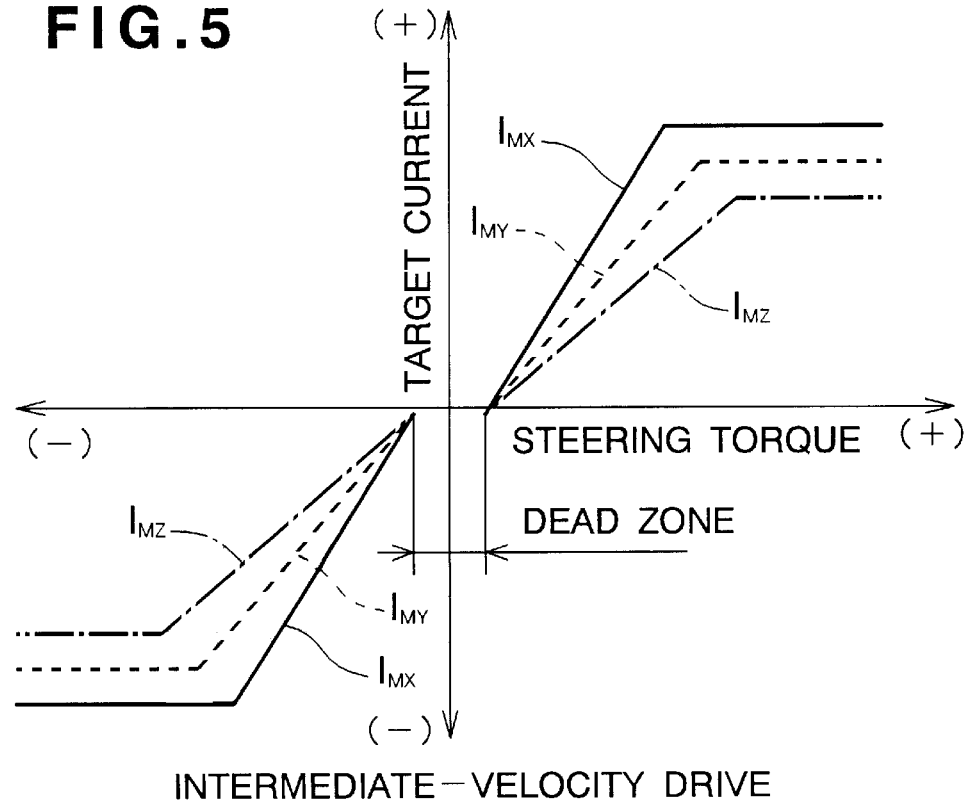
FIG. 5 INTERMEDIATE-VELOCITY DRIVE

HIGH-VELOCITY DRIVE

ELECTRIC POWER STEERING APPARATUS

BACKGROUND OF THE INVENTION

1. Field of the Invention

The present invention relates to electric power steering apparatuses for automotive vehicles which provide a steering assist of an electric motor directly to the vehicle steering system to reduce steering force to be applied manually by a vehicle driver.

2. Description of the Related Art

In recent years, there has been an increasing demand that an electric steering assist to vehicle driver's manual steering operation be provided with different characteristics depending on the sex, age, driving experience, etc. of the driver. To address to such a demand, an improved electric power steering apparatus has been proposed in Japanese Patent Laid-open Publication No. SRO-59-100059, which is designed to vary the vehicle's steering characteristics by switching between normal and sports modes as desired by the driver. The proposed electric power steering apparatus includes a torque detector for detecting steering torque, a control for variably controlling power output from the electric motor in accordance with an output signal from the torque detector, and a servo-rate setting device, positioned within the reach of the driver running the automotive vehicle, for setting a desired ratio of the output torque from the motor to a level of input signal to the control. With this electric power steering apparatus, steering characteristics as desired by the driver can be variably set by the driver operating the servo-rate setting device.

Specifically, the servo rate setting device in the proposed electric power steering apparatus is arranged to vary the relation between the level of input signal to the control and the output torque from the motor an; thereby vary the steering characteristics, by setting an amplification factor of an amplifier connected between it's torque signal input and the output of the torque detector. The servo rate can be set even during running of the automotive vehicle.

However, in the electric power steering apparatus proposed in Japanese Patent Laid-open Publication No. SHO-59-100059, the output torque from the motor would undesirably vary depending on the thus-set servo rate even when the steering wheel is operated with same steering torque, although the steering characteristics can be varied as desired by the driver even during running of the automotive vehicle. Because the steering characteristics vary as the servo rate is changed during steering operation, there could occur a sense of "incongruity" in the driver's steering operation, which would lead to a deterioration in the driver's steering feeling. Particularly, variations in the steering characteristics during a high-speed drive of the automotive vehicle would significantly deteriorate the driver's steering feeling and also adversely affect the vehicle behavior. Therefore, a more sophisticated electric power steering apparatus is currently desired which can effectively avoid a deterioration in the steering feeling and adverse effects on -he vehicle behavior.

SUMMARY OF TEE INVENTION

The present invention provides an electric power steering apparatus for an automotive vehicle, which comprises: an electric motor for applying an electric steering assist to a steering system of the automotive vehicle; a steering torque sensor for detecting steering torque manually applied to the steering system; a control unit for setting a target current corresponding at least to the steering torque detected by the steering torque sensor; and a drive for driving the electric motor on the basis of a motor control signal generated by the control unit, and which is characterized in that the control unit includes a plurality of assist mode generators to which are allocated different characteristics of the target current, any one of the assist mode generators can be switchably selected depending on a predetermined condition, and all of the assist mode generators are set in such a manner that the respective allocated characteristics of the target current become substantially uniform in a high-velocity drive of the automotive vehicle.

According to the present invention, all of the assist mode generators are set in such a manner that the respective allocated characteristics of target current become substantially uniform in a high-velocity driving condition. Thus, the steering characteristics are kept constant even when an assist mode change is effected during high-velocity running of the automotive vehicle, so that it is possible to effectively avoid a decline in the driver's steering feeling and adverse effects on the behavior of the automotive vehicle that would be caused by the assist mode change during the high-velocity running.

Further, in the low-velocity and intermediate-velocity driving conditions, the vehicle driver is allowed to selectively set one of the assist modes in accordance with his or her preference and thereby achieve optimum steering characteristics.

BRIEF DESCRIPTION OF THE DRAWINGS

The above and other objects and advantages of the present invention will become apparent from the following detailed description of the preferred embodiments when read in conjunction with the accompanying drawings, in which:

FIG. 4 is a graph showing exemplary control characteristic curves, of a target current versus detected steering torque for a low-velocity drive, employed in the mode control section;

FIG. 5 is a graph showing exemplary control characteristic curves, of the target current versus the detected steering torque for an intermediate-velocity drive, employed in the mode control section;

DETAILED DESCRIPTION OF THE PREFERRED EMBODIMENTS

Electric power steering apparatus of the present invention is arranged to keep steering characteristics substantially constant even when an assist mode change has been effected during steering operation in a high-velocity drive, to thereby effectively avoid a deterioration in the driver's steering feeling and adverse effects on the behavior of the automotive vehicle caused by the assist mode change in the high-velocity drive.

Figure 1:
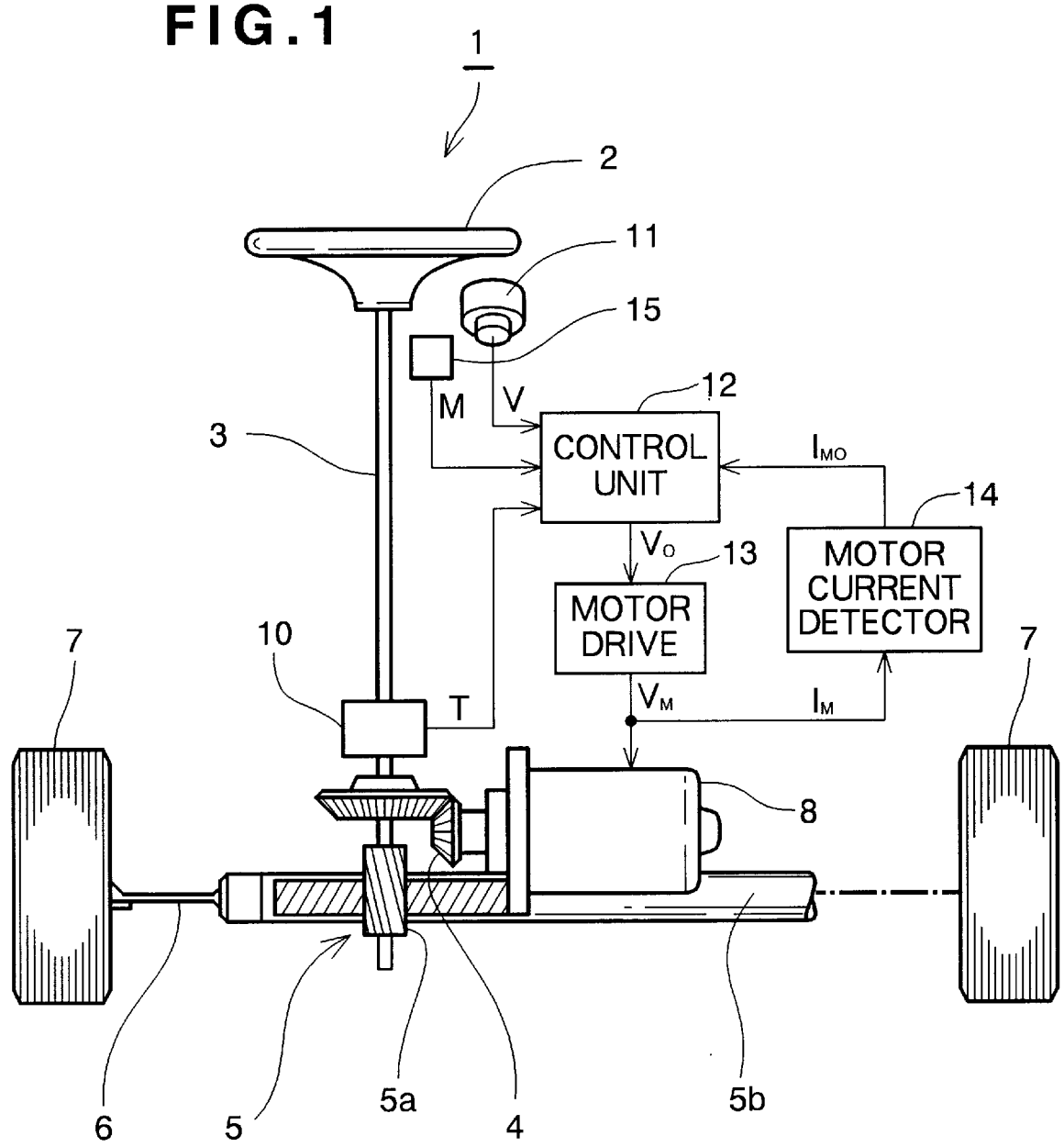
FIG. 1 is a diagram showing the overall setup of an electric power steering apparatus according to a preferred embodiment of the present invention.

FIG. 1 is a block diagram showing the general structure of the electric power steering apparatus according to one embodiment of the present invention. Mechanically, the electric power steering apparatus 1 comprises a steering wheel 2, a steering shaft 3, a hypoid gear 4, a rack and pinion set 5 including a pinion 5a and a rack shaft 5, left and right steerable front wheels 7 connected to the rack shaft 5b via tie rods 6, and an electric motor 8 for generating an electric steering assist.

Electrically, the electric power steering apparatus 1 comprises a steering torque sensor 10, a vehicle velocity sensor 11, a control unit 12, a motor drive 13, and a motor current detector 14. The steering torque sensor 10 detects steering torque acting on the steering wheel 2 and outputs a steering torque signal T that is an electric signal corresponding to the detected steering torque. The vehicle velocity sensor 11 detects a velocity of the automotive vehicle and outputs a vehicle velocity signal V that is an electric signal corresponding to the detected vehicle velocity. The control unit 12 sets a target current for driving the electric motor 8 on the basis of the steering torque signal T and vehicle velocity signal V and also generates a motor control signal $V_o$ corresponding to the target current. The motor drive 13 drives the electric motor 8 with a motor voltage $V_M$ based on the motor control signal $V_o$, using the known PWM (Pulse Width Modulation) control scheme. The motor current detector 14 detects a motor current $I_M$. corresponding to forward or reverse rotation of the electrical motor B.

The electric power steering apparatus 1 further includes a mode setting device 15 disposed, for example, near the driver's seat, which issues a mode setting signal M for purposes to be described below. In response to the mode setting signal M from the mode setting device 15, a particular assist mode generator is switchably selected from among a plurality of assist mode generators to which are allocated different characteristics (e.g., level values) of the target current, as will be described below. The switchable selection of one of the assist modes may be made depending on a current operating position of a shift lever where the automotive vehicle in question is of the automatic transmission (AT) type, or in accordance with an operating condition of the automatic transmission. In another alternative, the switchable selection of one of the assist modes may be made automatically depending on a friction coefficient $\mu$ between the road surface and the vehicle tires.

As the vehicle driver manually operates the steering wheel 2, the torque sensor 10 detects steering torque to feed a steering torque signal T to the control unit 12. The steering torque manually applied by the driver to true steering shaft 3 is converted, via the rack and pinion set 5, into an axial linear movement of the rack shaft 5b, which changes the steering direction of the front wheels 7 by way of the tie rods 6.

Figure 2:
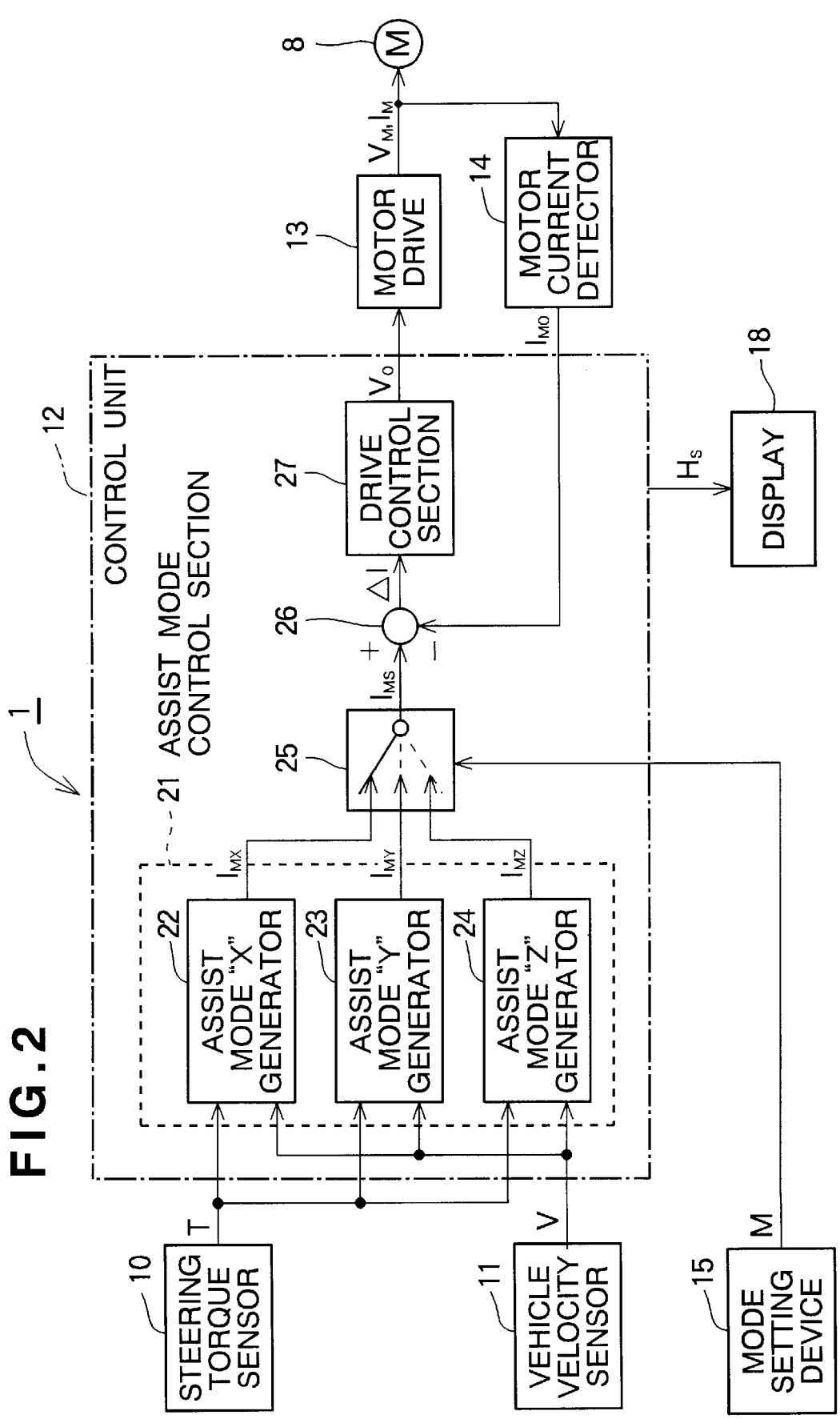
FIG. 2 is a block diagram showing principal parts of the electric power steering apparatus of FIG. 1.

FIG. 2 is a block diagram showing principal parts of the electric power steering apparatus of FIG. 1. The control unit 12, basically comprising a microprocessor, an arithmetic operation section, a processing section and a memory, includes an assist mode control section 21 having a plurality of assist mode generators 22 to 24 to which are allocated different characteristics (e.g., level values) of the target current corresponding at least to steering torque signal T. In response to a mode setting signal M given from the mode setting device 15, the control unit 12 selects a particular one of the assist mode generators 22 to 24 to which is allocated the target current characteristics corresponding to the signal M. Then, the control unit 12 generates a motor control signal $V_o$ corresponding to a target current signal (representing the characteristics) from the selected assist mode generator, in accordance with which the motor drive 13 drives the motor 8 with a motor voltage $V_M$. The selected assist mode generator is visually and audibly displayed to the vehicle driver by means of a predetermined display.

The motor drive 13 includes a plurality of (e.g., four) switching elements such as power FETs (Field Effect Transistors) and generates a motor voltage $V_M$ corresponding to the motor control signal $V_o$ (PWM signal so that the motor B is driven by a bidirectional motor current $V_I$ corresponding to the absolute value and direction of the steering torque signal T.

Torque generated by the electric motor 8 is increased twofold via the hypoid gear 4 and applied to the steering shaft 3 as an electric steering assist. The motor current detector 14 converts the motor current $I_M$, to be actually passed to the motor 8, into voltage by means of resistance and/or Hall effect device, and the converted voltage is then again converted into a digital detected motor current signal $I_{MO}$. The digital detected motor current signal $I_{MO}$ is sent to the control unit 12 for negative feedback to the target current.

FIG. 2 is a block diagram showing principal parts of the electric power steering apparatus 1 of FIG. 1, which include the torque sensor 10, vehicle velocity sensor 11, motor drive 13, motor 8, motor current detector 14 and display 18. According to the present invention, the electric power steering apparatus 1 further includes the mode setting device 15 disposed for example, near the driver's seat, which supplies the control unit 12 with a rode setting signal M corresponding to one of assist modes manually set by the vehicle driver.

The control unit 12 includes the assist mode control section 21, which is based on a memory such as a ROM and has a plurality of the assist mode generators, i.e., assist mode X generator 22, assist mode Y generator 23 and assist mode Z generator 24, a switch section 25, an offset calculating section 26 and a drive control section 27. Whereas the assist mode control section 21 is shown in the illustrated example as having three assist mode generators, it may have four or more assist mode generators. Thus, on the basis of the steering torque signal T and vehicle velocity signal V from the torque and velocity sensors 10 and 11, the assist mode generators 22 to 24 output target current signals $I_{MX}$, $I_{MY}$, $I_{MZ}$ (representing different characteristics of the target current) to the switch section 25.

More specifically, in the assist mode X generator 22, various level values of target current signal $I_{MX}$ corresponding to various possible values of steering torque signal T are empirically obtained and stored in association with values of vehicle velocity signal V as parameters, so that the generator 22 supplies the switch section 25 with one of the values of target current signal $I_{MX}$ corresponding to the steering torque signal T and vehicle velocity signal V currently detected by the torque and velocity sensors 10 and 11. Similarly, in each of the assist mode Y generator 23 and assist mode Z generator 4, various values of target current signal $I_{MY}$ or $I_{MZ}$ and corresponding to various possible values of steering torque signal T are empirically obtained and stored in association with values of vehicle velocity signal V as parameters, so that the generator 23 or 24 supplies the switch section 25 with one of the values of target current signal $I_{MY}$ or $I_{MZ}$ corresponding to the steering torque signal T and vehicle velocity signal V currently detected by the torque and velocity sensors 10 and 11.

Thus, the assist mode X generator 22 provides target current characteristics (values) suitable for a situation where a great electric steering assist relative to the steering torque signal T is required, namely, suitable for beginner's-class, female or aged drivers who need to be supplied a greater electric steering assist in response to manual operation of the steering wheel with small force. The assist mode Y generator 23 provides target current characteristics, corresponding to those obtained by the conventional normal-mode steering operation, which afford a smaller electric steering assist than that given by the assist mode X generator 22 in response to the same manual steering force. Further, the assist mode Z generator 24 provides target current signal characteristics, corresponding to those obtained by the conventional sports-mode steering operation, which afford a yet smaller electric steering assist than that given by the assist mode Y generator 23.

The switch section 25, which may comprise a software-controlled electronic switch, selects one of the target current signals $I_{MX}$, $I_{MY}$, $I_{MZ}$ from the generators 22 to 24 in accordance with a mode setting signal M given from the mode setting device 15 and sends the selected signal to the offset calculating section 26 as a target current $I_{MS}$ for the motor 8.

Figure 3:
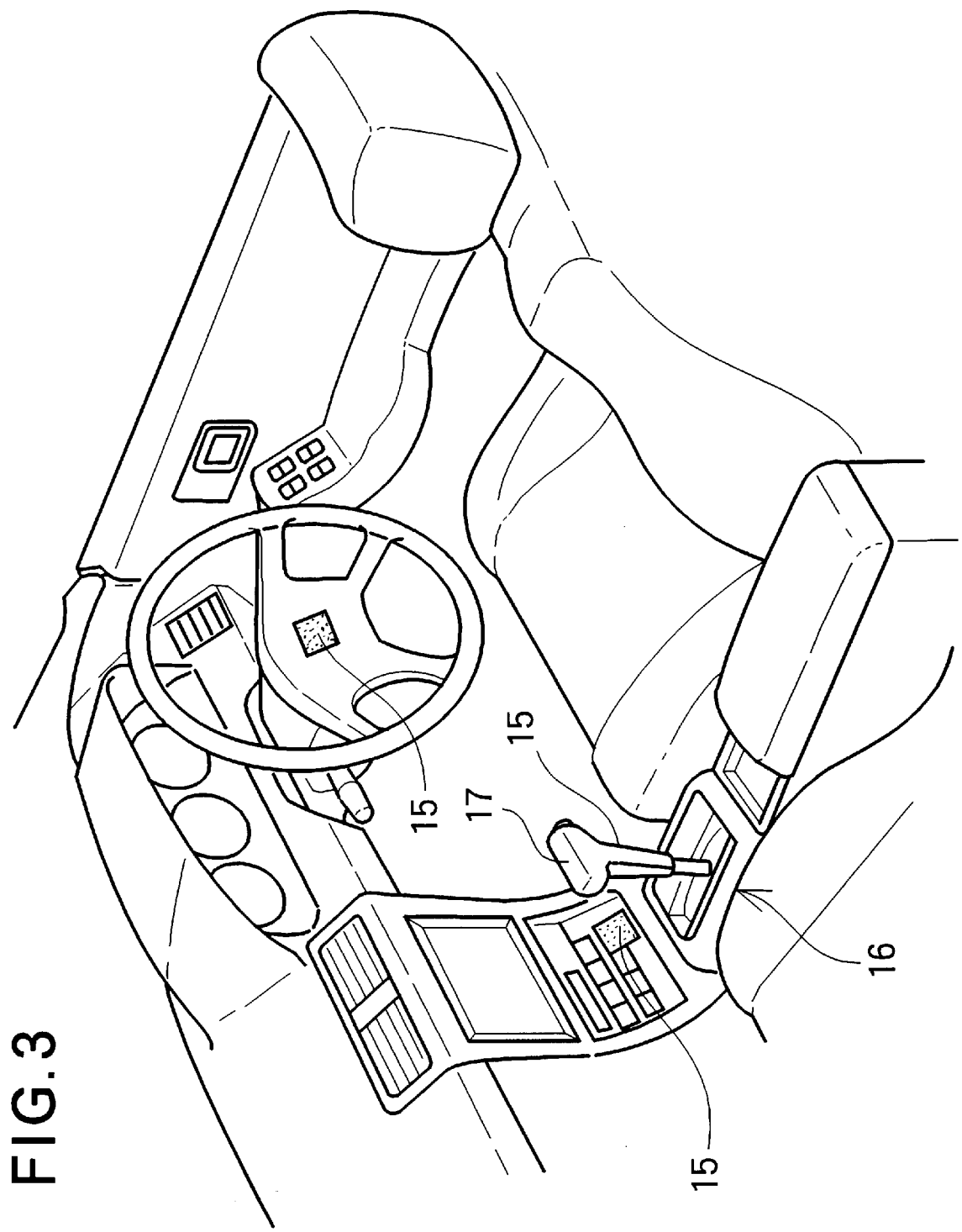
FIG. 3 is a perspective view showing exemplary positions where a mode setting device of FIG. 1 is mounted inside an automotive vehicle near the driver's seat.

FIG. 3 is a perspective view showing an exemplary manner in which the mode setting device 15 is provided inside the automotive vehicle near the driver's seat. In the figure, the setting device 15 is shown as comprising a plurality of push buttons switches in corresponding relations to the assist mode generators 22 to 24 of the assist mode control section 21 shown in FIG. 2; these push buttons may be positioned on the surfaces of an operation panel or steering wheel or a shift lever of an automatic transmission 16 if the automotive vehicle is of the AT type.

FIG. 4 is a graph showing exemplary control characteristic curves, of the target current $I_{MS}$ versus the steering torque T for a low-velocity drive $V_L$, employed in the assist mode control section 21. In a region where the steering torque signal T is in a small-value range at and around "0", there exists a "dead zone" where the target current $I_{MS}$ maintains a value "0" irrespective of an increase in the value of the steering torque signal T. As the steering torque signal T increases in value beyond the dead zone, the value of the target current $I_{MS}$ increases linearly and then reaches a saturated zone where it remains constant irrespective of the increasing value of the steering torque signal T.

As shown in FIG. 4, in the low-velocity driving condition $V_L$, the assist mode generators 22, 23 and 24 of FIG. 2 generate a target current signal $I_{MX}$ (solid line), target current signal $I_{MY}$ (broken line) and target current signal $I_{MZ}$ (dot-dash line), respectively, in response to the steering torque signal T. These target current signals $I_{MX}$, $I_{MY}$ and $I_{MZ}$ are of different values decreasing in the mentioned order; that is, the target current signal $I_{MX}$ generated by the assist mode X generator 22 has the greatest value and the target current signal $I_{MZ}$ generated by the assist mode Z generator 24 has the smallest value. Thus, the vehicle driver can select a desired one of the assist mode generators 22, 23 and 24 and hence set a target current signal $I_{MX}$, $I_{MY}$ or $I_{MZ}$ suitable for his or her actual manual steering force, by operating the mode setting device 15.

FIG. 5 is a graph showing exemplary control characteristic curves, of the target current $I_{MS}$ versus the steering torque T for an intermediate-velocity drive $V_Z$, employed in the assist mode control section 21. In the intermediate-velocity driving condition $V_M$, target current signals $I_{MX}$, $I_{MY}$ and $I_{MZ}$ present trends similar to those presented in the low-velocity driving condition $V_L$ of FIG. 4, but these signals $I_{MX}$, $I_{MY}$ and $I_{MZ}$ increase in value at a slower rate than the counterparts of FIG. 4 and reach saturated values smaller than those of FIG. 4.

By thus setting the target current signals $I_{MX}$, $I_{MY}$ and $I_{MZ}$ for the intermediate-velocity drive $V_M$ to be smaller in value than the counterparts for the low-velocity drive $V_L$, the electric steering assist from the motor 8 is controlled to become smaller as the vehicle velocity increases; that is, manual steering force to be applied by the driver gets greater as the automotive vehicle speeds up. Further, even in the intermediate-velocity driving condition $V_M$, the driver can select any one of the three target current signals $I_{MX}$, $I_{MY}$ and $I_{MZ}$ from the assist mode generators 22, 23 and 24 by operating the mode setting device 15, so that an optimum electric steering assist is achieved for the driver's actual manual steering.

Figure 6:
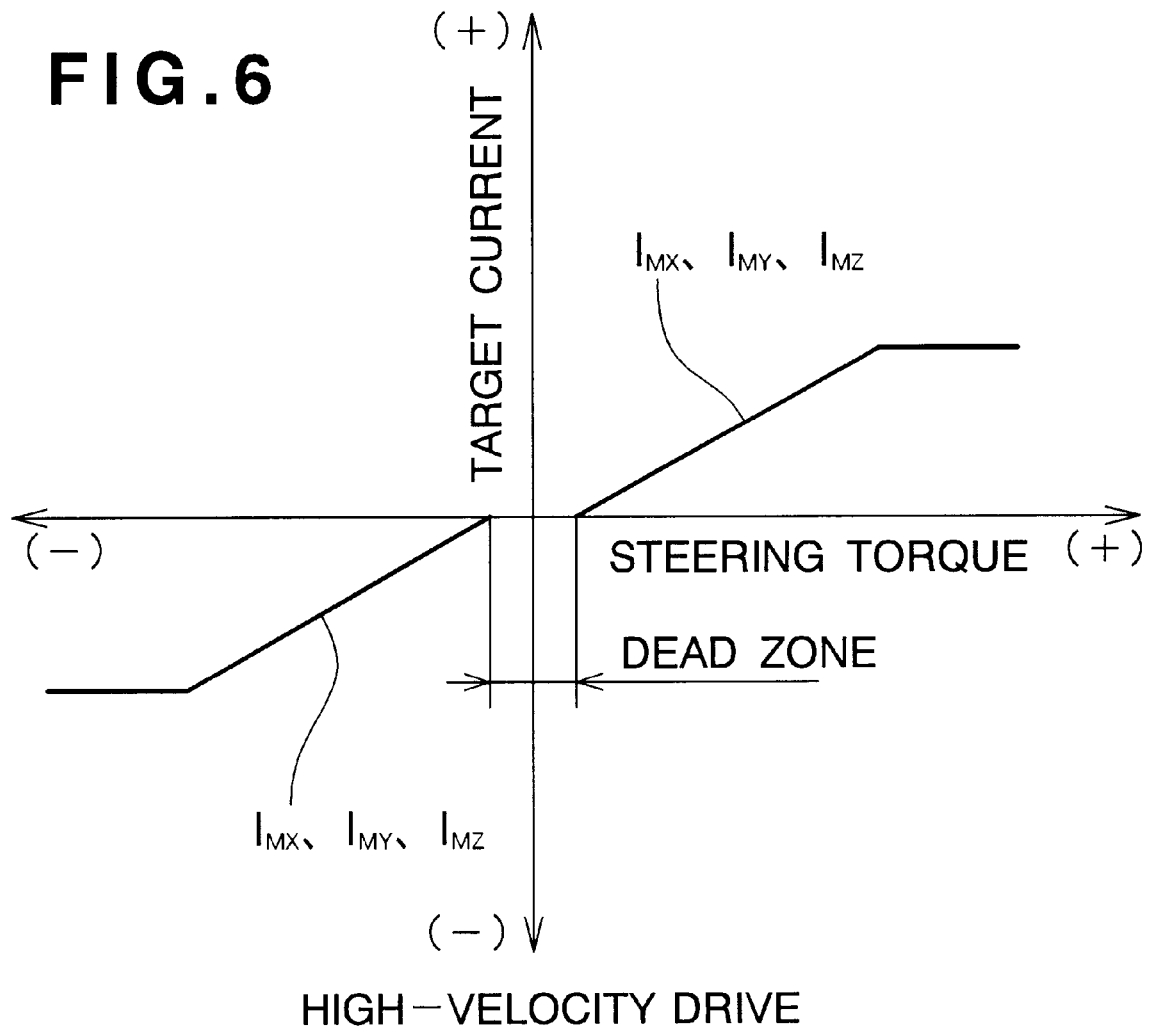
FIG. 6 is a graph showing exemplary control characteristic curves, of the target current versus the detected steering torque for a high-velocity drive, employed in the mode control section.

FIG. 6 is a graph showing exemplary control characteristic curves, of the target current $I_{MS}$ versus the steering torque T for a high-velocity drive $V_H$, employed in the assist mode control section. As shown, in the high-velocity driving condition $V_M$, the assist mode generators 22, 23 and 24 generate respective target current signals $I_{MX}$, $I_{MY}$ and $I_{MZ}$ that are identical to each other in value. In the high-velocity driving condition $V_H$, a large-value target current $I_{MS}$ is always unnecessary irrespective of manual steering force applied by the driver, and it is essential that the target current signals $I_{MX}$, $I_{MY}$ and $I_{MZ}$ present little or no variations in their values when there occurs a switch from one assist mode to another (assist mode change). Consequently, in the high-velocity driving condition $V_H$, no substantial variations in the values of the target current signals $I_{MX}$, $I_{MY}$ and $I_{MZ}$ and hence in the intensity of the electric steering assist result from the driver effecting a assist mode change during steering operation, so that it is possible to prevent an unwanted deterioration in the driver's steering feeling. Further, any assist mode change made during high-velocity drive $V_H$ would not adversely affect the behavior of the automotive vehicle because it does not involve substantial variations in the intensity of the electric steering assist due to switching between the target current signals $I_{MX}$, $I_{MY}$ and $I_{MZ}$.

Because each assist mode charge during steering operation in the low-velocity and intermediate-velocity driving conditions $V_L$ and $V_M$ entails a substantial switch between the values of the target current signals $I_{MX}$, $I_{MY}$ and $I_{MZ}$ relative to the steering torque signal T, it is desirable that such an assist mode change be effected while the steering wheel is not being operated at all (i.e., steering torque=0).

Referring back to FIG. 2, the offset calculating section 26 may comprises a software-controlled subtracter which calculates a difference or offset between the target current $I_{MS}$ ($I_{MX}$, $I_{MY}$ or $I_{MZ}$) sent via the switch section 25 and the digital detected motor current signal $I_{MO}$ corresponding to the motor current $I_M$ detected by the motor current detector 14, and feeds the thus-calculated offset $\Delta I$ (=$I_{MS}$-$I_{MO}$) to the drive control section 27.

The drive control section 27 includes a PID controller that applies PID (Proportional and Integral and Derivative) compensation operations to the offset signal $\Delta I$ (=$I_{MS}$-$I_{MO}$), and a signal generator that generates a motor control signal $V_O$ that is a composite or combination of a PWM (Pulse-Width-Modulated) signal and ON signal to control the direction and intensity of torque generated by the motor 8 on the basis of an output signal from the PID controller.

The motor drive 13 includes a bridge circuit comprised of a plurality or (e.g., four) switching elements such as power FET's (Field-Effect Transistors) and is controlled by the motor control signal $V_O$ containing the PWM (Pulse-Width-Modulated) signal and ON signal, so as to feed motor voltage $V_M$ of a given direction and intensity to the motor 8. Thus, the motor 8 is driven, by the motor voltage $V_M$ fed from the motor drive 13, to generate power or torque corresponding to the motor current $I_M$, and the thus-generated torque is applied to the vehicle steering system as an electric steering assistance.

Further, the motor current detector 14, which may comprise a Hall effect device or resistor for detecting current as voltage, detects the motor current $I_M$. passing through the motor 8 and feeding digital detected motor current $I_{MO}$ back to the negative (−) input of the offset calculating section 26. The motor current detector 14 constitutes a negative feedback loop together with the offset calculating section 26, drive control section 27 and motor drive 13, and control is performed such that the offset signal $\Delta I$ (=$I_{MS}-I_{MO}$) promptly becomes zero ($I_{MS}=I_{MO}$) so that the motor current $I_M$ promptly equals the target current $I_{MS}$.

Display 18, which may comprise a visual display such as a liquid crystal display or an audio display such as a sound synthesizer, visually or aurally informs the vehicle driver of various states of the currently-selected control assist mode.

Figure 7:
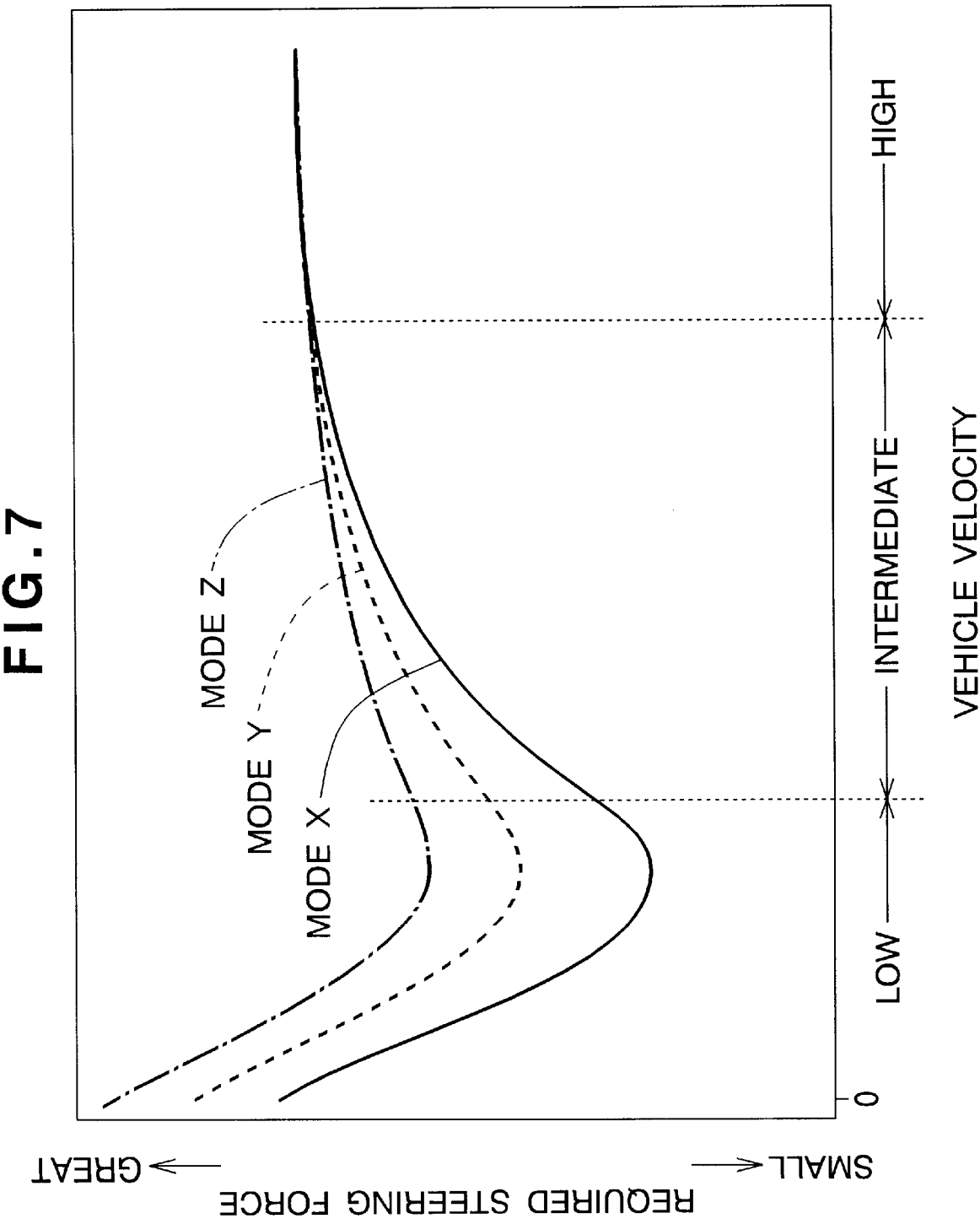
FIG. 7 is a graph showing relationships between the vehicle velocity and the necessary manual steering force in the three assist modes of the electric power steering apparatus according to the present invention.

Finally, FIG. 7 is a graph showing relationships between vehicle velocity and manual steering force in the three assist modes of the electric power steering apparatus according to the present invention. As shown, a manual steering force that needs to be applied by the driver to largely turn the steering wheel during stoppage of the automotive vehicle, i.e., when the vehicle velocity is "0" (hereinafter called "during-stoppage steering force") is relatively great in all of the assist nodes X, Y and Z; more specifically, the "during-stoppage steering force" in the assist mode X is set to be smaller than the "during-stoppage steering force" in the mode Y which is in turn set to be smaller than that in the mode Z.

As the vehicle velocity increases for a low-velocity drive, counteractive force from the road surface decreases and the electric steering assist is governed by the control characteristics of FIG. 4, so that the necessary steering force in the assist mode X (corresponding to target current signal $I_{MX}$) becomes additionally smaller than the necessary steering force in the mode Y (corresponding to target current signal $I_{MY}$) which in turn becomes additionally smaller than that in the mode Z (corresponding to target current signal $I_{MZ}$).

Then, in an intermediate-velocity drive, the electric steering assist is governed by the control characteristics of FIG. 5, so that the differences between the necessary steering forces in the three assist modes gradually increase due to an automatically-occurring great braking action responsive to the increasing vehicle velocity, although the magnitudes of the necessary steering forces remain in the above-mentioned order, Further, in a high-velocity drive, the electric steering assist is governed by the control characteristics of FIG. 6, so that the necessary steering forces in the three assist modes become substantially uniform due to the automatic braking action responsive to the increasing vehicle velocity.

FIG. 7 apparently shows that in the low-velocity and intermediate-velocity driving conditions, the vehicle driver is allowed to selectively set one of the assist modes in accordance with his or her inclination or preference and thereby achieve optimum steering characteristics, because the necessary steering force is differentiated by selecting one of the assist modes X, Y and Z. Further, in the high-velocity drive, the necessary steering force can remain substantially unchanged even when an assist mode change has been made, so that the driver is allowed to change one assist mode to another without affecting the steering feeling. Because an assist mode change during the high-velocity drive does not involve a substantial variation in the necessary steering force, the driver is allowed to switch between the assist modes without adversely affecting the behavior of the automotive vehicle.

What is claimed is:

1. An electric power steering apparatus for an automotive vehicle comprising:

an electric motor for applying an electric steering assist to a steering system of the automotive vehicle;

a steering torque sensor for detecting steering torque manually applied to the steering system;

a control unit for setting a target current corresponding at least to the steering torque detected by said steering torque sensor; and a drive for driving said electric motor on the basis of a motor control signal generated by said control unit, wherein said control unit includes a plurality of assist mode generators to which are allocated different characteristics of the target current, any one of the assist mode generators can be switchably selected depending on a predetermined condition, and all of said assist mode generators are set in such a manner that the respective characteristics of the target current become substantially uniform in a high-velocity drive of the automotive vehicle.

2. An electric power steering apparatus for an automotive vehicle as recited in claim 1 which further comprises a mode setting device for switchably selecting one of said assist mode generators.

* * * * *